United States Patent [19]

Soshin et al.

[11] Patent Number: 5,154,242

[45] Date of Patent: Oct. 13, 1992

[54] POWER TOOLS WITH MULTI-STAGE TIGHTENING TORQUE CONTROL

[75] Inventors: Koji Soshin, Toyonaka; Shinichi Okamoto, Higashi-Yodogawa, both of Japan

[73] Assignee: Matsushita Electric Works, Ltd., Osaka, Japan

[21] Appl. No.: 749,864

[22] Filed: Aug. 26, 1991

[30] Foreign Application Priority Data

Aug. 28, 1990 [JP] Japan .................. 2-227293
Aug. 28, 1990 [JP] Japan .................. 2-227294

[51] Int. Cl.$^5$ ............... B25B 23/147; B23Q 17/09
[52] U.S. Cl. .................... 173/178; 81/469; 73/862.23; 73/862.331; 173/179; 173/180
[58] Field of Search ............. 173/2, 11, 12; 81/467, 81/469, 470; 318/432, 434; 73/761, 862.23, 862.36

[56] References Cited

U.S. PATENT DOCUMENTS

| | | |
|---|---|---|
| 3,892,146 | 7/1975 | Yasoshima . |
| 3,962,910 | 6/1976 | Spyridakis et al. . |
| 4,249,117 | 2/1981 | Leukardt et al. ............ 173/12 |
| 4,562,389 | 12/1985 | Jundt et al. ............ 81/469 |
| 4,685,050 | 8/1987 | Polzer et al. ............ 81/467 |
| 4,813,312 | 3/1989 | Wilhelm . |
| 4,908,926 | 3/1990 | Takeshima et al. ............ 173/12 |
| 4,987,806 | 1/1991 | Lehnert ............ 81/469 |
| 5,014,793 | 5/1991 | Germanton et al. ............ 173/12 |

FOREIGN PATENT DOCUMENTS 60-47071 10/1985 Japan .
2-100882 4/1990 Japan .

*Primary Examiner*—Frank T. Yost
*Assistant Examiner*—Scott A. Smith
*Attorney, Agent, or Firm*—Stevens, Davis, Miller & Mosher

[57] ABSTRACT

A power tool includes a DC motor for tightening a fastener through three consecutive stages. In the first stage, the motor is rotated at a high speed to tighten the fastener to a pre-seated condition which is acknowledged by the tool. Then, the motor is temporarily stopped and restarted at a low speed for tightening the fastener to its seated condition to complete the second stage. At the third stage, a control is made to gradually increase a field current in a feedback manner by constantly monitoring the field current flowing through the motor up to a predetermined current limit determined as directly related to an intended tightening torque at which the fastener is tightened past the seat condition. After the field current reaches the current limit, the motor is stopped to complete the tightening cycle. By monitoring the field current during the third stage to control the field current in the feedback manner, it is possible to accurately determined the final tightening torque which is related substantially directly to the field current, assuring to tighten the fastener accuractely to a desired final torque. The tool is also capable of increasing the field current at differing rates up to the current limits of different values within a constant period of time so as to complete the tightening of the fastener within substantially the same perod of time irrespective of the differing requirements for the final tightening torque.

8 Claims, 9 Drawing Sheets

POWER TOOLS WITH MULTI-STAGE TIGHTENING TORQUE CONTROL

BACKGROUND OF THE INVENTION

1. Field of the Invention

The present invention is directed to a power tools with multi-stage tightening torque control, and more particularly to a clutch-less power tool including a DC motor for tightening fasteners to a desired tightness through a plurality of control stages.

2. Description of the Prior Art

Japanese patent examined publication [KOKOKU] No. 60-47071 published on Oct. 19, 1985 discloses a torquing power tool utilizes an electric motor for tightening a fastener through two tightening stages. A control is firstly made to apply a high voltage to the motor for driving the fastener at a high speed until the fastener is detected to be seated. Upon detection of the seated condition which is made by monitoring a critical increase in a field current flowing through the motor, the motor is temporarily stopped. Then, the motor is restarted with an increasing voltage up to a predetermined limit and is again stopped after an elapse of a predetermined time period in order to further tighten the fastener at a starting torque of the motor. Unfortunately, however, such voltage control will not compensate for variation in resistance which is most likely in the electric circuit of the motor due to the temperature variation of the motor during a continued use and therefore fail to accurately determine a desired final tightening. Consequently, it may be still necessary to incorporate a mechanical clutch limiting the tightening torque in order to tighten the fastener reliably to an accurately predetermined tightness.

Another prior power tool is disclosed in Japanese patent non-examined early publication (KOKAI) No. 2-100882 published on Apr. 12, 1990. The patent proposes a multi-stage torquing power tool utilizes an electric motor for tightening a fastener through a plurality of tightening stages in which the fastener is tightened at differently controlled torques. The power tool includes a distance sensor to monitor a gap distance between the fastener's head and a work surface into which the fastener is being tightened and detect a pre-seated condition when the gap distance reduced to a predetermined value as indicative of that the fastener is just before seated. A control is firstly made to apply a high voltage to the motor for driving the fastener at a high speed until the fastener is detected to advance to the pre-seated condition, after which a low voltage is applied to the motor so as to tighten the fastener at a low speed to its seated condition for reducing an impact at the seating. Upon detection of the seated condition, a reverse voltage is applied to stop the motor. Then, the motor is restarted with a gradually increasing voltage from a relatively low voltage to a predetermined limit in order to further tighten the fastener at a correspondingly increasing torque. The predetermined voltage limit is selected to define a tightening torque at which the fastener is tightened into the work surface past the seated condition. Because the power tool also relies on the voltage control for determination of the tightening torque, it will suffer from resistance variation in the electric circuit of the motor and fail to tighten the fastener accurately and reliably at a desired torque.

SUMMARY OF THE INVENTION

The above problem has been eliminated in the present invention which provides a power tool which includes a DC motor for tightening a fastener through three consecutive stages. In a first stage, the motor is rotated at a high speed to be tightened to a pre-seated condition which is acknowledged by the power tool. Then, the motor is temporarily stopped and restarted at a low speed for tightening the fastener to its seated condition to complete a second stage. At a third stage, a current control takes over the speed control to gradually increase a field current in a feedback manner by constantly monitoring the field current flowing through the motor up to a predetermined current limits selected as directly related to a final tightening torque at which the fastener is tightened past the tightened condition. After the field current reaches the current limit, the motor is stopped to complete the tightening operation. The DC motor, which has a characteristic of increasing an output torque in direct proportion to an increase in a field current fed through the motor, includes a motor output shaft operatively connected to a drive bit for tightening the fastener such as a screw and a nut. A speed/revolution detector is provided for detection of a speed and revolutions of the motor. The motor is connected to a driver circuit which is responsible for driving the motor at varying speeds and torques. A speed controller is associated with the driver to rotate the motor output shaft selectively at high and low speeds by controlling a voltage applied to the motor for tightening the fastener during the first and second stages. A current sensor is included to monitor the field current flowing through the motor and provide a feedback signal. Associated with the current sensor is a current controller which varies the field current based upon the feedback signal to correspondingly vary the motor output torque during the third stage of tightening the fastener up to a desired tightness. The power tool further includes a pre-seat judge section which determines the pre-seated condition where the fastener is just before seated and generates a pre-seat signal indicative of the pre-seated condition. A seat detector is also included to detect a seated condition where the fastener is actually seated and to generate a seat signal indicative of the seated condition. An input section is provided to set a final tightening torque at which the fastener is tightened past the seated condition and store the final tightening torque as directly related to a corresponding current limit for the field current. A central controller is provided to activate the speed controller only during the first and second stages and in turn activate the current controller only during the third stage. That is, the central controller operates to firstly activate the speed controller in such a manner as to drive the motor at the high speed, stop it in response to the pre-seat signal [first stage], and to restart the motor at the low speed [second stage]. Upon receiving the seat signal, the central controller responds to activate the current controller instead of the speed controller in such a manner as to drive the motor by controlling to increase the field current in the feedback manner at a suitable rate up to the current limit [third stage] in order to further tighten the fastener past the seated condition at the final tightening torque determined by the current limit. Upon reaching the current limit, the central controller causes the current controller to stop feeding the field current, thereby stop the motor and completing to tighten the fastener to a desired tightness accurately in exact correspondence to the final tightening torque. Because of that the field current is monitored to effect feedback control of increasing the field current up to the predetermined current limit and also because of controlling the field current rather than the voltage applied to the motor, it is possible to obtain an accurate tightening torque which is directly related to the field current and is free from possible variation in electrical resistance of the motor circuit, thereby successfully eliminating any mechanical clutch while assuring a reliable and accurate torquing to a desired tightness.

Accordingly, it is a primary object of the present invention to provide a clutch-less power tool which is capable of tightening the fastener accurately and reliably to a desired tightness.

The central controller is capable of increasing the field current at differing rates up to the current limits of different values within a constant period of time so as to complete the tightening of the fastener within substantially the same period of time irrespective of the differing requirements for the final tightening torque. Thus, the power tool can give an improved convenience of tightening the fasteners of differing torquing requirements equally within substantially the same time period, which is therefore another object of the present invention.

The power tool is preferred to include a temperature sensor which senses the temperature of the motor and provides a sensed temperature output indicative thereof. The central controller has a compensator which, in response to the temperature output, adjusts a level of the field current in compensation for temperature-dependent variation in magnetic flux density of a magnetic circuit of the motor to thereby give a consistent tightening torque substantially free from temperature variation. Such variation is likely to occur during a continued use of the tool and would change the tightening torque T which is the function of the magnetic flux density Φ and the field current I, as expressed below:

$$T \propto \phi nT$$

wherein n is the number of turns of wire forming a coil of the motor.

It is therefore a further object of the present invention to provide a power tool which is capable of compensating for temperature-dependent variation in magnetic flux density of a magnetic circuit of the motor to provide a more consistent tightening torque free from the temperature variation.

The temperature compensation may be also utilized to adjust a voltage applied to the motor from the source voltage in order to drive the motor consistently at the high speed as determined during the first stage of tightening the fastener to the pre-seated condition.

The power tool of the present invention provides three different modes of determining the pre-seated condition of the fastener. A first mode is a learn-and-work mode in which the motor is driven to rotate for tightening a sample fastener to its seated condition in order to give a seating revolution number of the motor required to tighten the sample fastener to the seated condition. Thus obtained seating revolution number is processed to be decreased by a few revolutions or less to give a pre-seating revolution number which is stored in a memory. At this time, the motor is stopped to complete the operation of determining the pre-seat condition. Then, a control is made to actually tighten the fastener by starting the motor, during which a comparator compares the actual number of revolutions of the motor with the pre-seating revolution number such that the pre-seat signal is issued once the actual revolution number reaches the pre-seating revolution number. In response to 10 the pre-seat signal, the motor is controlled to be temporarily stopped and is restarted to tighten the fastener at the low speed to the seated condition [second stage] followed by being rotated by the current control to tighten the fastener to the desired tightness [third stage].

A second mode is a data entry one in which data entry section is responsible for entering data indicative of pitch and effective thread length with regard to the fastener intended to be tightened. The data is stored in a memory and is processed to calculate a seating revolution number required for tightening the fastener to its seated condition and to obtain a pre-seating revolution number which is thus calculated seating revolution number minus a few number of revolutions or less. A comparator is responsible to compare the actual number of revolutions of the motor with the pre-seating revolution number such that the pre-seat signal is issued once the actual revolution number reaches the pre-seating revolution number for stopping the motor.

A third mode is a real-time sensing mode in which a distance monitor constantly monitors a gap distance between a bit end of the motor and a work surface into which the fastener is being tightened, determines the pre-seated condition when the distance decreases to a predetermined value, and issues the pre-seat signal in response to the pre-seated condition for stopping the motor.

It is therefore a still further object of the present invention to provide a power tool which includes a unique configuration of successfully determining the pre-seated condition.

Preferably, the power tool can be made to have the above three modes so as to selectively utilize one of the modes dependent upon the user's requirement, thus improving flexibility in using the power tool.

These and still other objects and advantages of the present invention will become more apparent from the following detailed description of the embodiment when taken in conjunction with the attached drawings.

DETAILED DESCRIPTION OF THE PREFERRED EMBODIMENT

Figure 1:
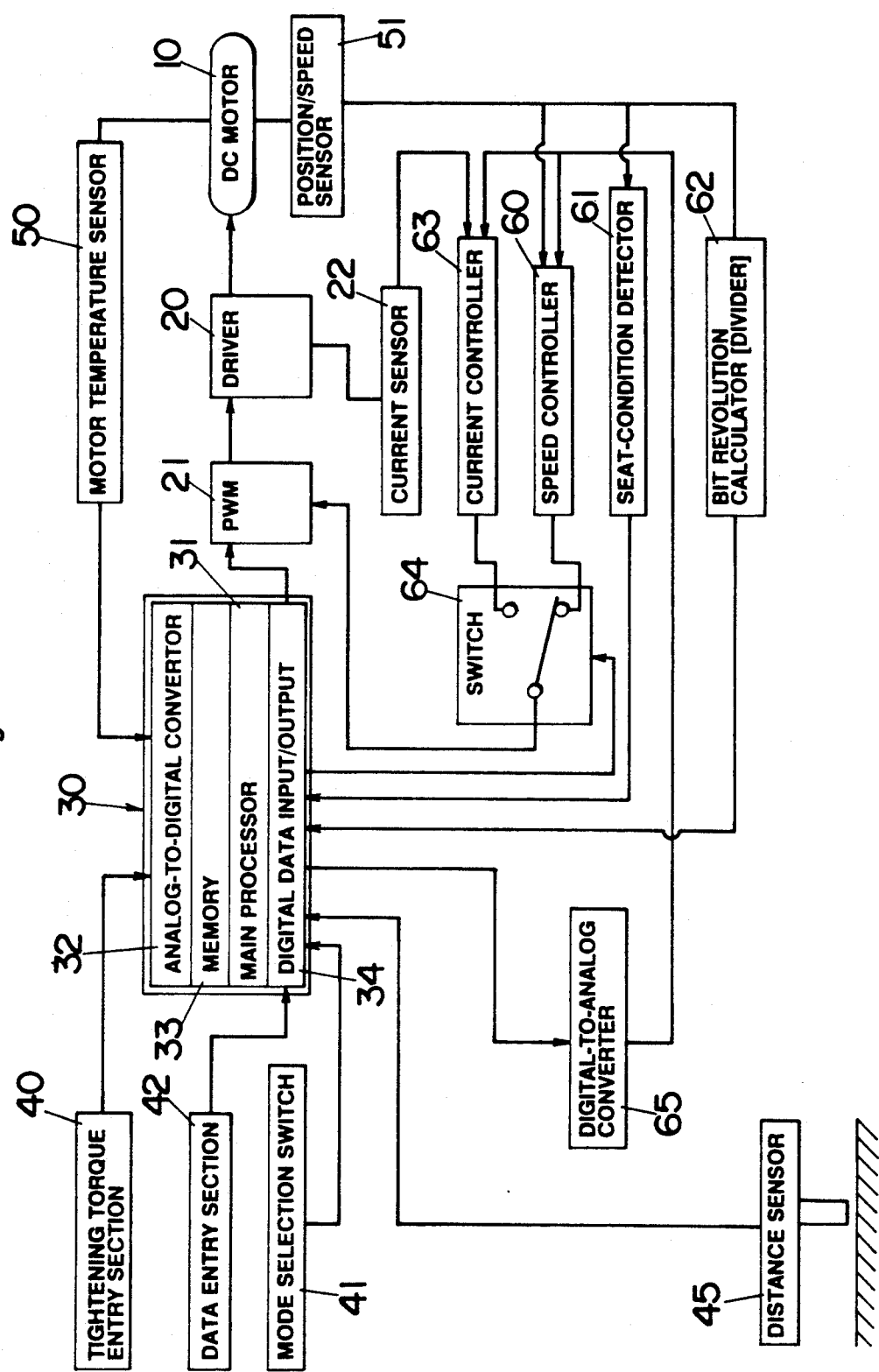
FIG. 1 is a block diagram illustrating a control system of a power tool in accordance with a preferred embodiment of the present invention.

Referring now to FIG. 1, there is shown a control system for a power tool in accordance with a preferred embodiment of the present invention. The power tools comprises a DC motor 10 having an output shaft (not shown) connected through a set of reduction gears (not shown) to a drive spindle carrying a bit for tightening a fastener such as a screw or the like. A battery (not shown) is incorporated in the power tool to provide a constant source voltage to energize the motor 10 through a driver 20 of a conventional configuration having a switching transistor. A pulse-width-modulator (PWM) 21 is connected to the driver 20 in order to vary a field current, i.e., motor current flowing through the motor 10 for adjusting the speed and Output torque of the motor 10 under the control of a central controller 30.

Figure 2:
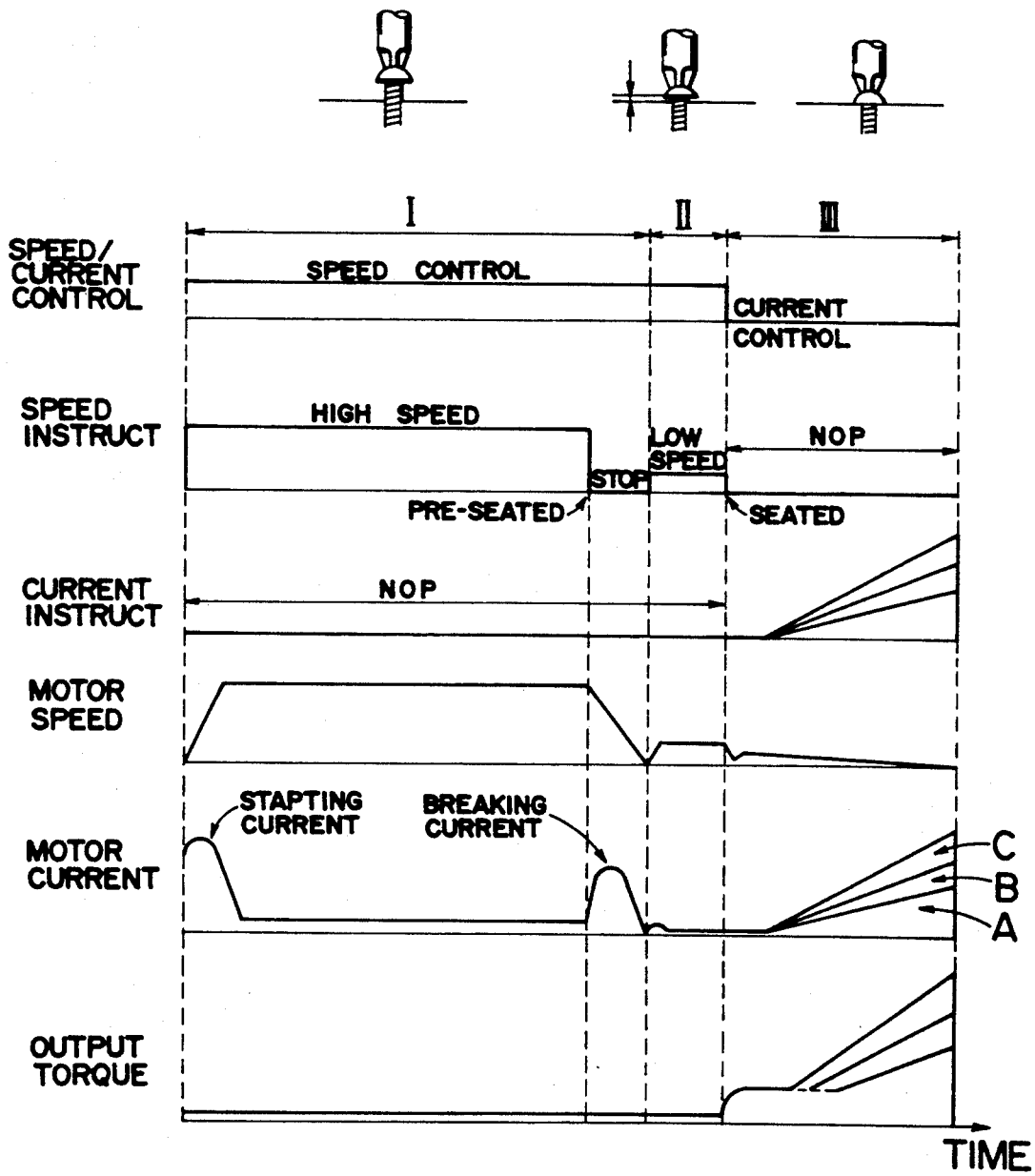
FIG. 2 is a timing chart for controlling a DC motor in the power tool.

The central controller 30 is provided to achieve a three-stage tightening cycle for lightening the fastener while monitoring the speed of the motor 10 and the motor current, and also to determine, based upon suitable input data, a pre-seated condition at which the fastener is just before seated. The tightening cycle is shown in FIG. 2 to comprise a first stage [I], a second stage [II], and a third stage [III]. In the first stage [I], the motor 10 is driven to rotate at a high speed until the fastener comes to the pre-seated condition at which the motor 10 is caused to rapidly slow down to a zero speed at the end of the first stage [I]. The second stage [II] follows immediately to restart motor 10 at a low speed until the fastener is seated. The low speed is selected to a minimum speed of the motor 10 so as to reduce the seating impact as much as possible. Then, the third stage [III] commences to gradually increase the motor current up to a predetermined current limit and stop feeding the motor current after the motor current reaches the current limit, thereby tightening the fastener at a final tightening torque determined in coincidence with the current limit. The central controller 30 comprises a main processor 31 responsible for the above three-stage tightening control and for determination of the pre-seated condition, as will be discussed in detail hereinafter, an analog-digital converter 32, a memory 33, and a digital input/output 34.

A tightening torque entry section 40 is provided to enter an analog value determining the final torque at which the fastener is tightened to a desired tightness. The analog value of the final tightening torque is fed to the analog-digital converter 32 where it is converted into a corresponding digital value which is indicative of the above current limit and is stored in the memory 33 to be processed at the main processor 31 for the above tightening control during the third stage of the tightening cycle of FIG. 2. Also fed to the analog-digital converter 32 is a signal indicative of a motor temperature sensed by a motor temperature sensor 50 provided within or in the vicinity of the motor 10. Further, the motor 10 is associated with a position/speed sensor 51 which, for example, comprises a frequency generator [FG] to monitor the position and the angular speed of the motor 10 and outputs a corresponding speed signal to a speed controller 60, a seat-condition detector 61, and a bit revolution calculator 62. The speed controller 60 compares the speed signal with a pre-set speed value fed from the central controller 30 and issues a feedback signal through a switch 64 to the PWM 21 in order to keep the motor speed at a constant level designated by the pre-set value. That is, the speed controller 60 receives from the central controller 30 the pre-set speed value which designates a high speed during the first tightening stage [I] and a minimum speed during the second tightening stage [II] to drive the motor 10 selectively at the high and low speeds, respectively. The seat-condition detector 61 acknowledges that the fastener is seated when the speed signal shows a remarkable slow down or decrease below a predetermined value and issues a seat-signal indicative of the seated condition back to the central controller 30. The speed signal is also fed to the bit revolution calculator 62 which divides the number of sensed revolutions by a reduction ratio of the reduction gear to provide the corresponding number of revolutions that the bit has experienced, the resulting data being fed to the central controller 30. The calculator 62 may be included in the central processor 30. A current sensor 22 is coupled to the driver 20 so as to monitor the motor current generated in the driver 20 and flowing through an armature of the motor 10 and outputs a current signal to a current controller 63. The current signal is compared at the current controller 63 with a reference current value given from the central controller 30 to output a current feedback signal to the PWM 21 through the switch 64 in order to regulate the motor current in an exact correspondence to the reference current value during the third tightening stage [III]. The reference current value is controlled to vary at the central controller 30 so as to correspondingly vary the motor current as indicated by curves A, B, and C of FIG. 2 up to the predetermined current limit, thereby tightening the fastener to a desired tightness or at the final tightening torque determined by the current limit. The pre-set speed value and reference current value are given respectively to the speed controller 60 and the current controller 63 in analog values through a digital-to-analog converter 65 from the central controller 30. The switch 64 operates under the control of the central controller 30 such that it transmits to the PWM 21 only the speed feedback signal from the speed controller 60 until the seat condition detector 61 acknowledges the seated condition, i.e., during the first and second stages of FIG. 2 and turns to transmit only the current feedback signal from the current controller 63 after the detection of the seated-condition.

Figure 8:
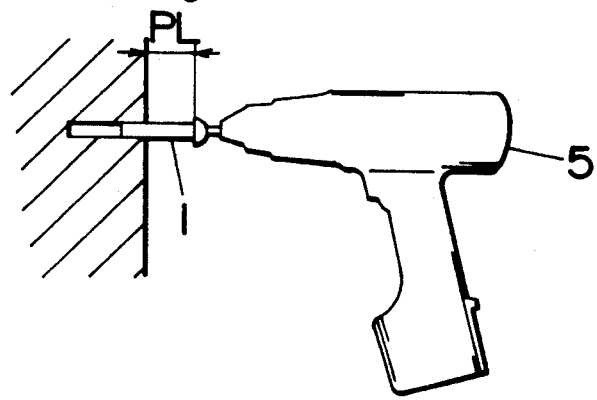
FIG. 8 is a schematic view illustrating a manner in which the power tool learns a length or the number of revolutions required for tightening a sample fastener to its seated condition.

The power tool includes a mode selection switch 41 for selecting one of three modes in which the central controller 30 can determine the pre-seated condition of the fastener. The first mode is a learn-and-work mode in which a sample fastener 1 is driven into a work surface by the power tool, as shown in FIG. 8, to determine a pre-seat length PL at which the sample fastener 1 is expected to come into the pre-seated condition. To this end, the bit revolution calculator 62 counts the number of revolutions required for the bit to tighten the sample fastener 1 into the seated condition which can be acknowledged by the seat-condition detector 61. Thus obtained seating revolution number of the bit is subtracted by several revolutions of the bits or less to define a pre-seating revolution number which is stored in the memory 33 as directly related to the above pre-seat length for judgement of the pre-seated condition at the later operation of tightening the identical fastener into the work surface.

Figure 9:
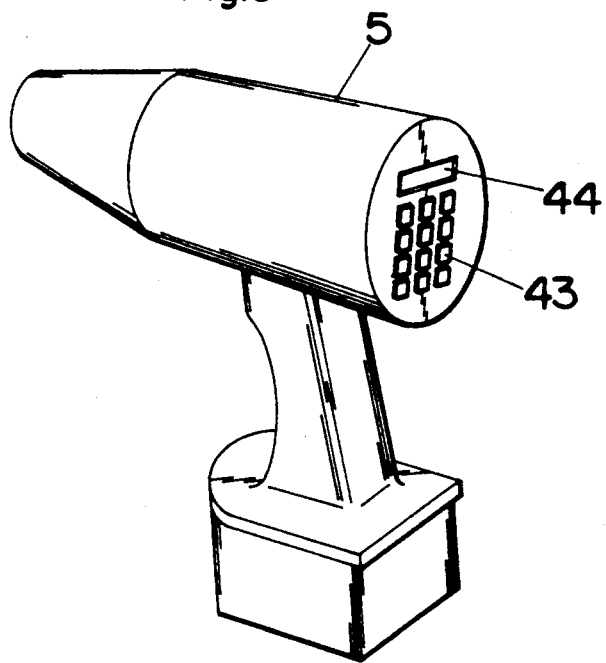
FIG. 9 is a schematic view of the power tool provided with a data entry pad and display.
Figure 10:
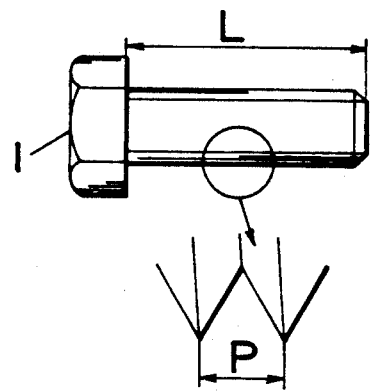
FIG. 10 is a view showing a typical fastener configuration.

The second mode is a data entry mode in which data or parameters known to the intended fastener are input at a data entry section 42 as indicative of pitch P and effective thread length L of the fastener 1, as shown in FIG. 10. The data are processed at the main processor 31 to calculate the seating revolution number for the bit to tighten the fastener 1 into the seated condition based upon the known relation $N = L/P$, wherein N is the number of revolutions of the fastener or the bit. The pre-seating revolution number is also defined as thus calculated seating revolution number minus several revolutions of the bit or less. The seating and pre-seating revolution numbers are stored in the memory 33 for judgement of the pre-seated condition in the later tightening operation in consideration of the actual number of the revolutions of the bits detected at the detector 61. Alternately, the central controller 30 may be configured to have a table storing groups of individual data with respect to different kinds of fastener such that the data for the specific fastener can be designated simply by entering a designation numeral, symbol, or the like assigned to the intended fastener. For entering the individual data or designation symbol, the power tool is provided at its rear end with a key pad 43 with display 44, as shown in FIG. 9, which may be also utilized to enter the tightening torque.

Figure 11:
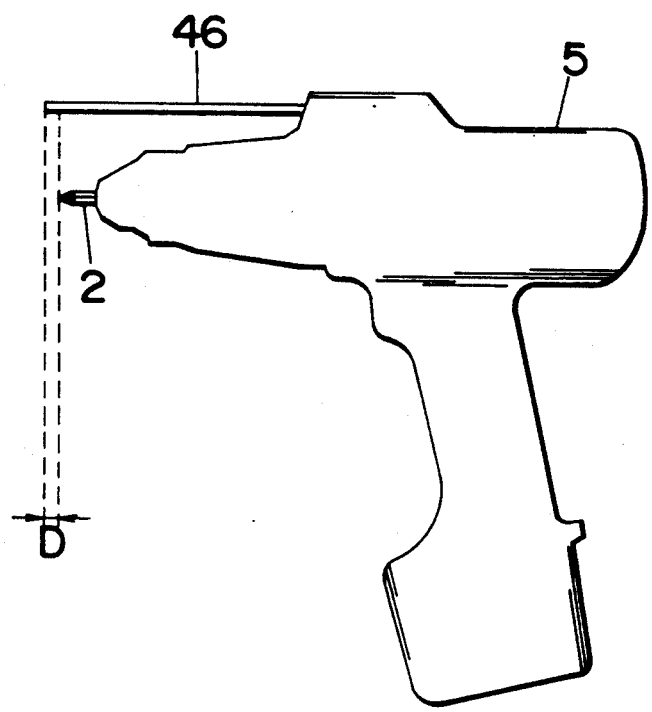
FIG. 11 is a schematic view illustrating the power tool provided with a pilot rod for sensing a pre-seated condition of the fastener.
Figure 12:
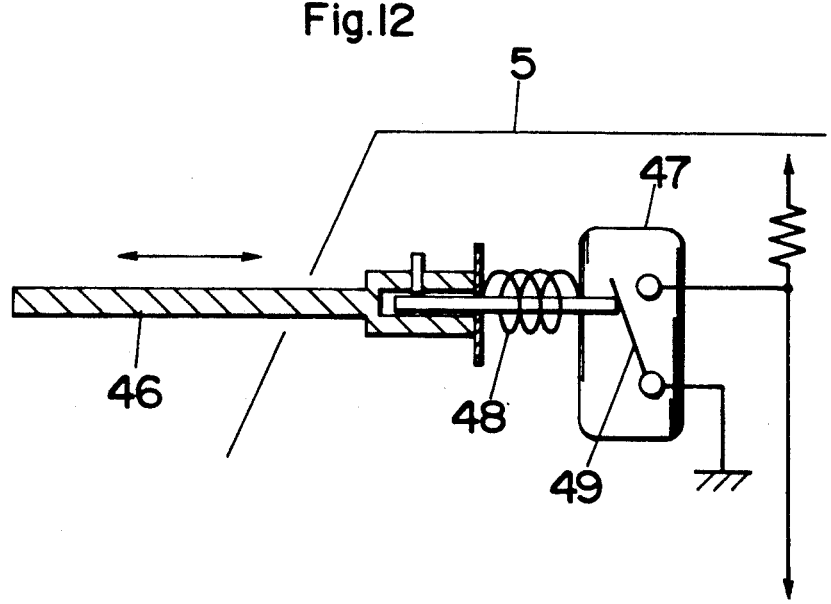
FIG. 12 is a schematic view illustrating a sensor configuration associated with the pilot rod.

The third mode is a real-time sensing mode in which a distance sensor 45 monitors a distance between a bit end of the tool and a work surface into which the fastener is being tightened so as to determine the pre-seated condition when the distance decreases to a predetermined value corresponding to several revolutions of the fastener or less. When the pre-seated condition is determined, the sensor 45 issues a pre-seat signal to the central controller 30 which responds to provide a stop signal to driver 20 to stop the motor 10. FIGS. 11 and 12 show a distance sensor 45 which comprises a pilot rod 46 extending in parallel with the bit from a tool housing 5 and a miniature switch 47 incorporated in the tool housing 5. The pilot rod 46 is held movable along its length with respect to the tool housing 5 so as to adjust a gap distance D between the front distal end of the pilot rod 46 and the corresponding end of bit 2. The ga distance D is normally adjusted to be a length corresponding to the several times of the fastener's pitch or less such that the pre-seated condition is detected when the front distal end of the pilot rod 46 comes into abutment against the work surface into which the fastener is being tightened. The pilot rod 46 is biased forwardly by a spring 48 to maintain the gap and is coupled at its rear end to a movable contact of the switch 47 through an actuator 49 so that the actuator 49 will close the switch 47 when the pilot rod 46 is forced to move rearwardly in response to the abutment of the pilot rod 46 against the work surface, whereby the switch 47 issues the pre-seat signal to the central controller 30 to temporarily stop the motor 10. For detection of the gap distance, a linear encoder may be utilized in place of the above distance sensor.

Now, the operation sequence of the power tool is discussed in detail with reference to FIGS. 4 to 7. Reference is firstly made of FIG. 4 which shows a flow chart of an overall operation of the power tool. Upon energization of the power tool [START], the system asks to set one of the above three modes [MODE SET]. After selecting the mode, the system proceeds to check which mode is selected from the three modes and complete one of the corresponding routines A, B, C of the selected modes. Any one of the three mode can be stored as a default mode so that the system will pass the MODE SET step to complete the routine of the default mode unless the mode is to be changed. After completing the routine of the individual mode, the system goes back to the MODE SET step.

Figure 5:
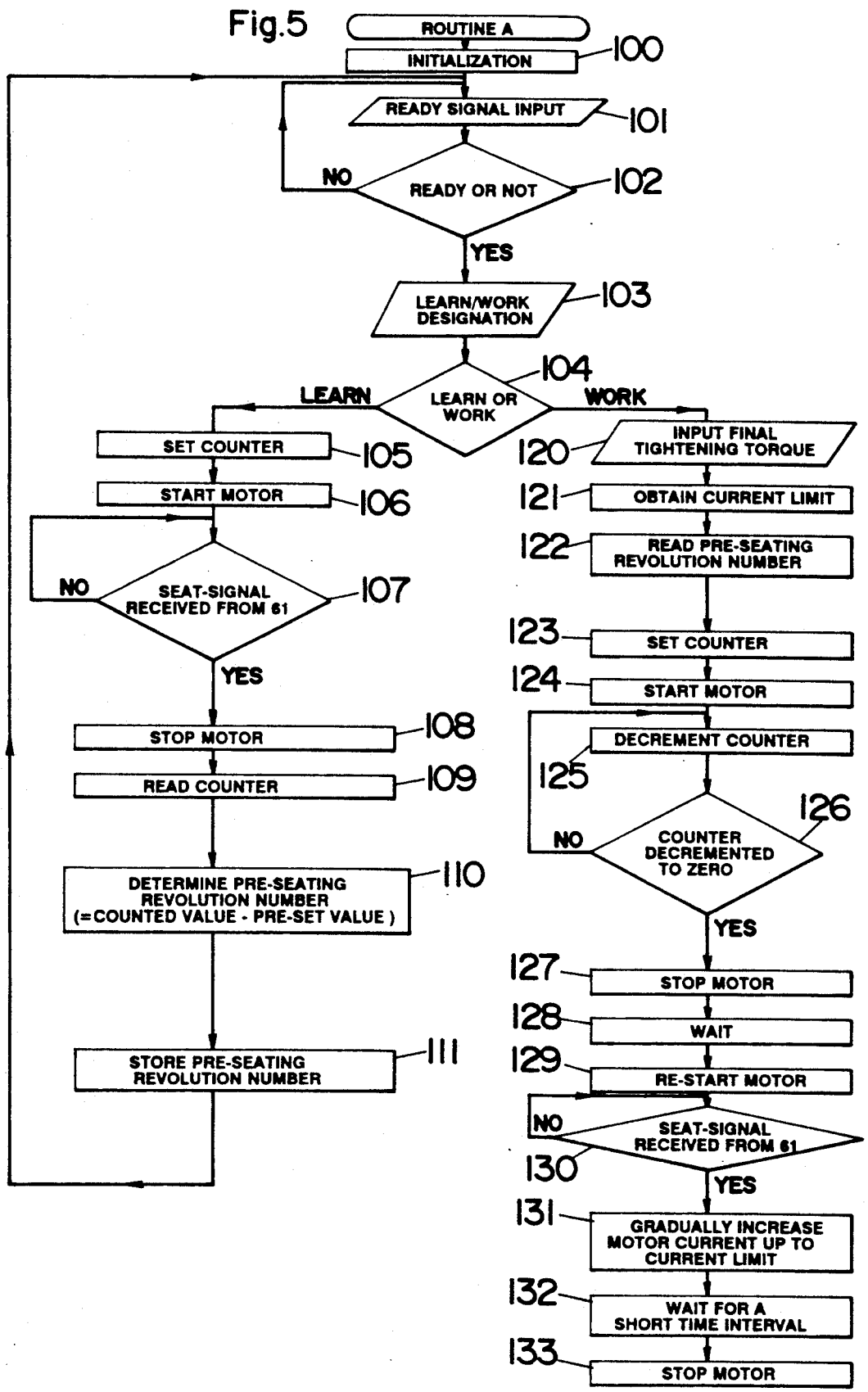
FIG. 5 is a flow chart illustrating a learn-and-work operation mode of the power tool.

When the learn-and-work mode is selected, the system goes to the routine A, as shown in a flow chart of FIG. 5, in which an initialization step 100 is firstly made to reset the control circuit of the power tool and the system waits until it receives a ready signal indicative of that the power tool is ready to operate [step 101]. After the ready signal is received, the system acknowledges that the system is ready to operate [step 102] and calls for which one between a learn-mode and a work-mode is designated [step 103]. When the learn-mode is designated [step 104], the central controller 30 sets an internal counter to be ready for counting the number of revolutions of the bit [step 105]and causes the motor 10 to start rotating for tightening the sample fastener 1 into the work surface [step 106]. The tightening is made until the seat-signal is received from the seat-condition detector 61 as a result of that the motor speed is sensed to decrease below the predetermined value [step 107]. When the seat-signal is received, the controller 30 recognizes that the fastener is seated and stops the motor 10 [step 108]. At this occurrence, the controller 30 responds to read the number of the revolutions Of the bit as accumulated in the counter [step 109] and determines the pre-seating revolution number which is the counted value indicative of the revolution number of the bit minus a pre-set value corresponding to several revolutions of the bit or less [step 110]. Thus obtained pre-seating revolution number or value is stored in the memory 33 [step 111] to complete the learn-mode, after which the system goes back to the step 101 to again wait the ready signal. Subsequently, when the step 104 is reached and the work-mode is selected instead, the routine goes to a work-mode starting at a step 120 calling for input of a desired final tightening torque which is processed to obtain a corresponding current limit level stored in the memory 33 and given to the current controller 63 [step 121]. Then, the controller 30 reads the pre-seating revolution number from the memory 33 [step 122], sets it into a counter [step 123], and start rotating the motor 10 [step 124] for tightening the fastener into the work surface. At the same time, the counter starts decrementing the pre-seating revolution number by the number of revolutions of the bits being obtained by the calculator 62 [step 125]. Accordingly, the motor 10 is driven to rotate constantly at the high speed under the control of the speed controller 60 to tighten the fastener until the counter is decremented to zero which is indicative of that the fastener has been tightened to the pre-seated condition. Upon the counter decremented to zero [step 126], the central controller 30 issues the stop signal to stop the motor 10 [step 127] and waits for a short time interval [step 128] before the motor 10 is restarted [step 129]. At this time, the motor 10 is again driven by the speed controller 60 to rotate at the minimum speed until the seat-signal is received from the seat-condition detector 61 [step 130]. Upon this occurrence, the current controller 63 takes over to gradually increase the motor current in order to correspondingly increase the output torque of the motor 10 according to a predetermined manner up to the current limit stored in the memory 33 [step 131] for further tightening the fastener past the seated condition. When the current limit is reached, the central controller 30 instructs to keep flowing the motor current at the current limit for a predetermined short time interval [step 132] and finally stop the motor 10 [step 133] to complete the work-mode of tightening the fastener to a desired tightness determined by the final tightening torque.

Figure 6:
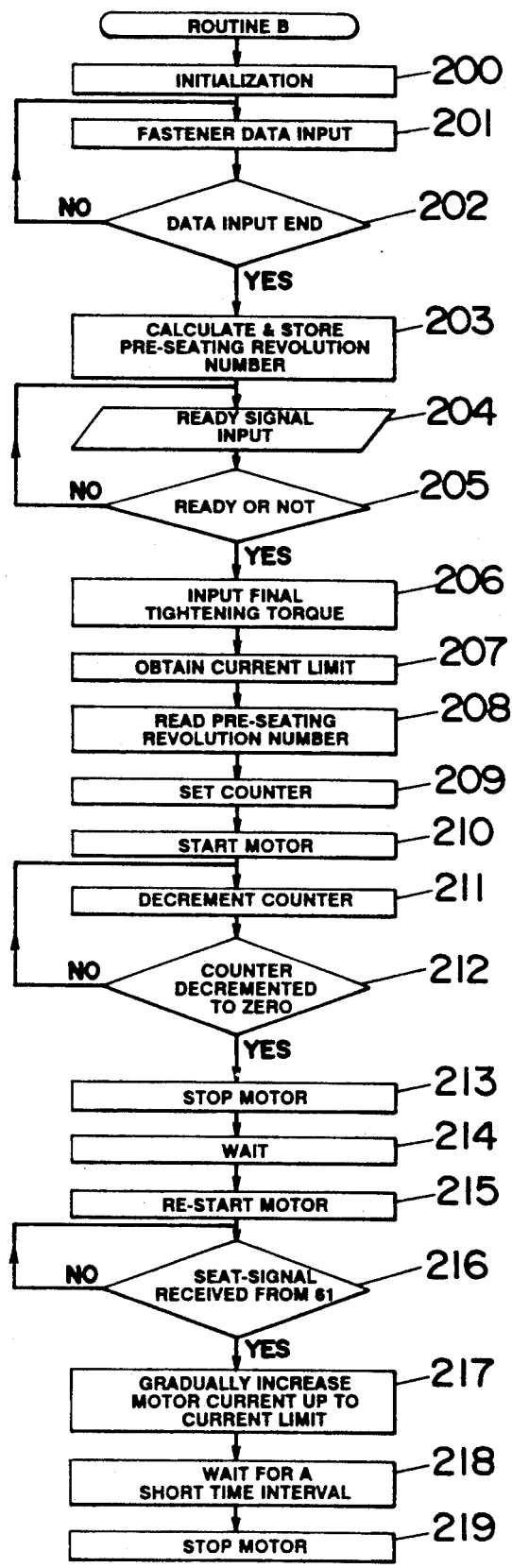
FIG. 6 is a flow chart illustrating a data entry operation mode of the power tool.

When the data entry mode is selected, the system goes to the routine B of FIG. 6 which starts from the like initialization step 200 to reset the control circuit of the power tool and calls for input of the data or parameters of the intended fasteners [step 201]. After knowing the end of the data input [step 202], the central controller 30 calculates from the input data the pre-seating revolution number required for the fastener to be tightened to the pre-seated condition and stores the calculated revolution number step 203]. Then, the system waits until it receives a ready signal indicative of that the power tool is ready to operate [step 204]. After the ready signal is received, the system acknowledges that the system is ready to operate step 205] and calls for the input of a desired final tightening torque [step 206]. The tightening torque input is processed to obtain a corresponding current limit level given to the current controller 63 [step 206]. Thereafter, the system follows the steps of 207 to 219 which are identical to the steps of 121 to 133, as discussed in the learn/work mode operation of FIG. 5.

Figure 7:
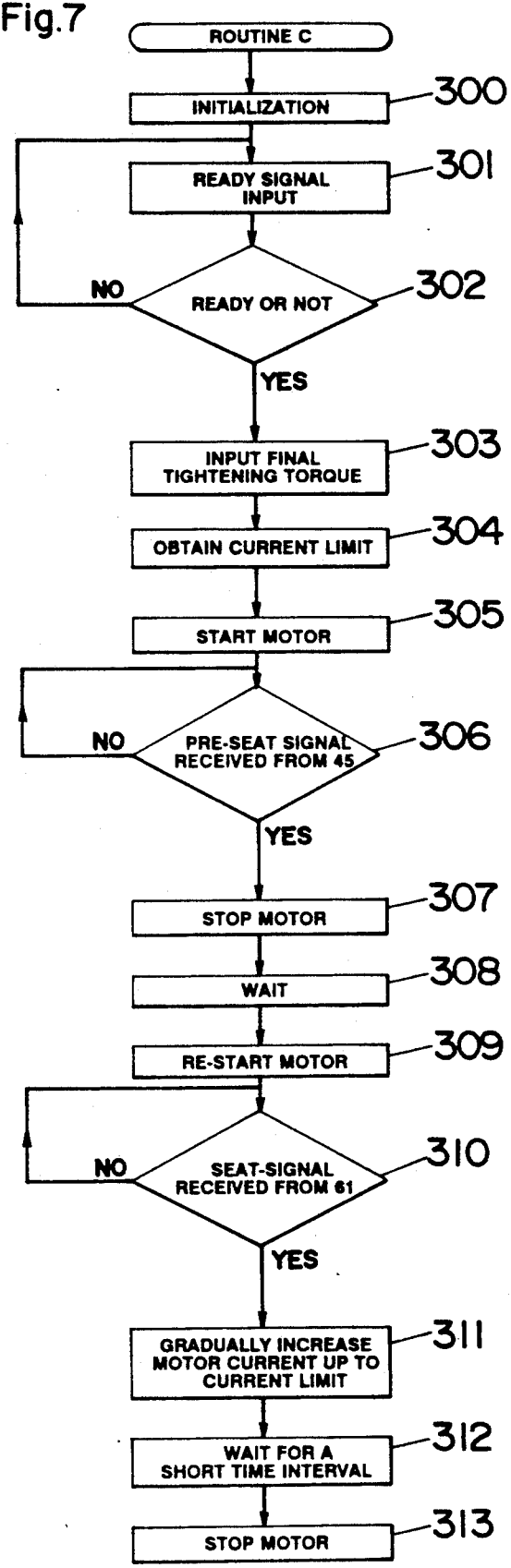
FIG. 7 is a flow chart illustrating a real-time sensing mode of the power tool.

When the real-time distance sensing mode is selected, the system goes to the routine C of FIG. 7 and makes an initialization of resetting the control circuit of the power tool [step 300]. Subsequently, the system waits until it receives a ready signal indicative of that the power tool is ready to operate [step 301]. After the ready signal is received, the system acknowledges that the system is ready to operate [step 302] and calls for the input of a desired final tightening torque [step 303]. The tightening torque input is processed to obtain a corresponding current limit level given to the current controller 63 [step 304]. Then, the motor 10 is allowed to start [step 305] and operated constantly at the high speed under the control of the speed controller 60 until the pre-seat signal is received from the distance sensor 45. Upon receiving the pre-seat signal [step 306], the central controller 30 responds to issue the stop signal to stop the motor 10 [step 307] and waits for a short time interval [step 308] before the motor 10 is restarted [step 309]. At this time, the motor 10 is controlled again by the speed controller to rotate at the minimum speed until the seat-signal is received from the seat-condition detector 61 [step 310]. Thereafter, the system follows the steps of 311 to 313 which are identical to the steps of 131 to 133 as discussed in the learn/work mode operation of FIG. 5.

The tightening operation common to the above three modes will be discussed in more detail with reference to FIGS. 1 and 2. Shortly after being started, the motor 10 comes into a high speed operation and is controlled by the speed controller to keep rotating the high speed until the stop signal is issued from the central controller 30 in consequence of that the fastener is tightened to the pre-seated condition. At this occurrence, the speed controller 30 acts on the PWM 21 to temporarily stop the motor 10 through a transient period at the end of the first stage [I] where the motor sees a breaking current, as shown in FIG. 2. Immediately after the motor 10 is stopped, the control proceeds to the second stage [II] in which the motor 10 is restarted and driven to rotate at the minimum speed until the seat-signal is received from the seat-condition detector 61 as a result of that fastener is actually seated. Also during the second stage [II], the speed controller 60 is responsible for controlling the motor 10 to rotate constantly at the minimum speed predetermined by the central controller 30. After the fastener is seated, the control proceeds to the third stage [III] in which the current controller 63 is brought into operation instead of the speed controller 60 so as to increase the motor current with an attendant turn-over of the switch 64 for connection of the PWM 21 to the current controller 63 from the speed controller 60. In this stage [III], the motor current is controlled to firstly kept substantially at zero level for a short time period and to increase gradually at a constant rate up to the current limit determined by the central controller 30 as corresponding to the final tightening torque, as shown in FIG. 2. Upon reaching the current limit, the motor current is kept thereat for a certain short time interval to thereby tighten the fastener exactly at the desired final tightening torque to the corresponding tightness, after which the central controller 30 responds to cease the motor current to complete the tightening operation.

It should be noted in this connection that the central controller 30 is capable of increasing the motor current at differing rates A, B, and C to correspondingly increase the torque, as shown in FIG. 2, such that the fastener can be tightened to different tightness within substantially a constant time period. Thus, it is possible to equalize the cycles for tightening the fasteners at differing torque to thereby increase the convenience of the tightening operation. To this end, the central controller 30 is programmed to vary the rate of increasing the current and therefore the increasing rate of the reference value fed to the current controller 63 for differing tightening torque inputs in order to complete the tightening cycle within substantially the same operation time. However, it is equally possible to increase the motor current at a fixed rate to tighten the fastener to different tightness.

Figure 3:
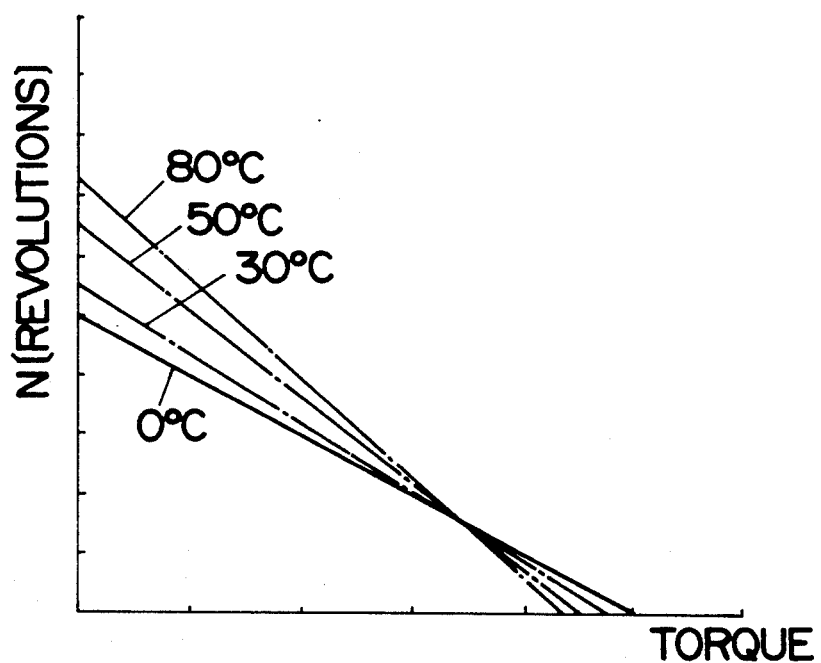
FIG. 3 is a graph illustrating a torque-speed [number of revolutions] relation of the DC motor.
Figure 4:
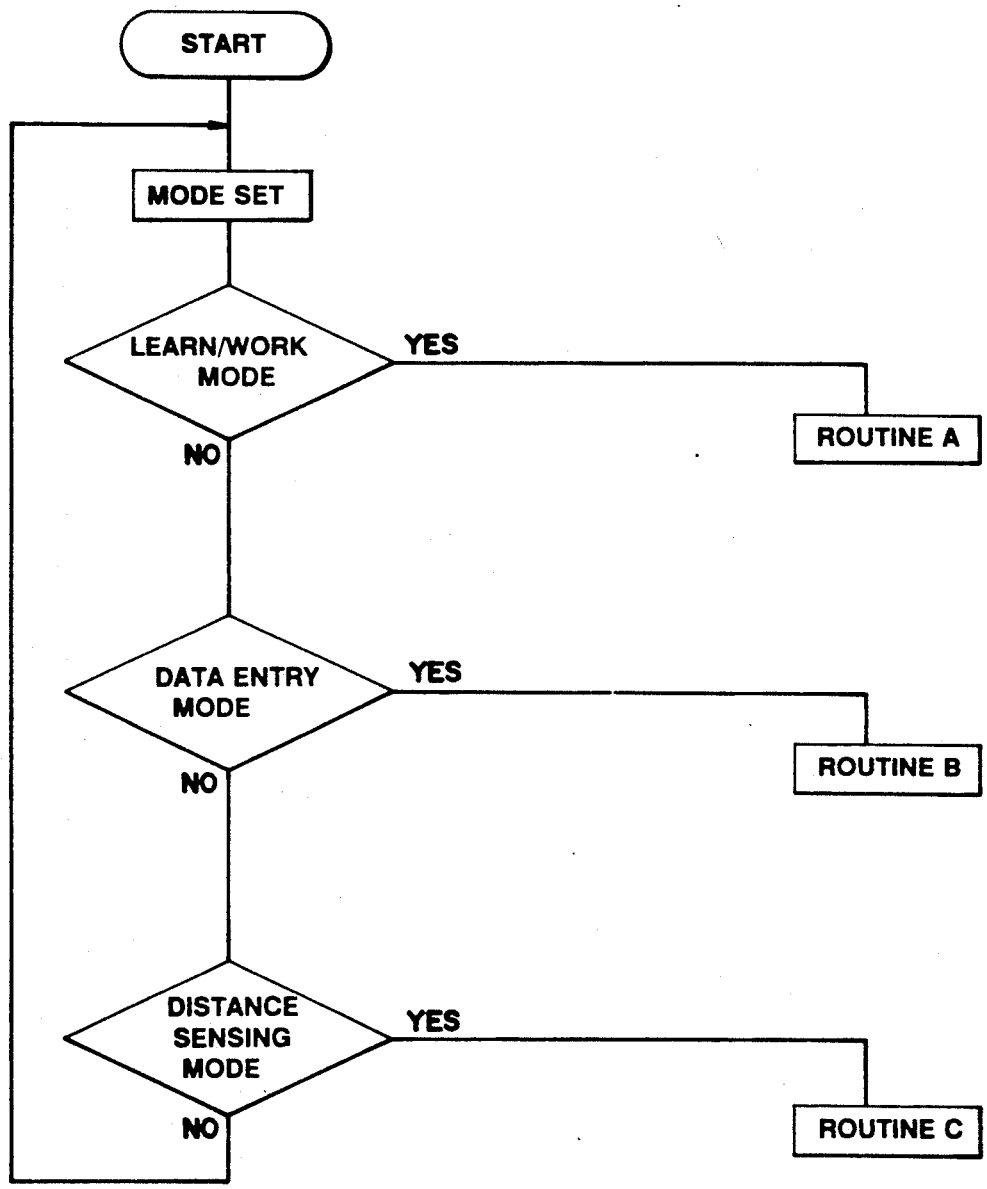
FIG. 4 is a flow chart illustrating a basic operation of the power tool.

The current control for the motor 10 at the tightening stage [III] is found advantageous to tighten the fastener to a desired tightness or torque T which is in well coincidence with the motor current I as known from the following relation:

$$T = k\phi nI = kn\phi(E/R)$$

wherein k is a torque constant, $\Phi$ is the magnetic flux density, n is the number of turns of the wire forming a coil of the motor, E is the voltage applied to the motor, and R is a resistance of the wire. That is, the current control can offset possible variations in the resistance of the motor due to the temperature variation as well as in the source voltage so as to give a consistent torque control. Nevertheless, $\Phi$ may vary with the temperature so as to result a corresponding variation in the motor output torque T. That is, $\Phi$ will decrease with the temperature increase to thereby lower the resulting tightening torque. This is known from FIG. 3 which schematically illustrate torque-speed characteristics [T-N curves] for the motor 10 when driven at a constant motor current but at different motor temperatures. In the figure, a solid line represents a T-N curve at 0° C., and dotted line represent T-N curves at elevated temperatures, i.e. 30°, 50°, 80° C., respectively. To avoid the temperature-dependent variation in the output torque and obtain a most reliable torque control, the central controller 30 is configured to monitor the motor temperature at the temperature sensor 50, correlate the motor temperature to the magnetic flux density $\Phi$, and to increase the motor current in compensation for the reduction of the magnetic flux density $\Phi$ based upon the correlation between the motor temperature and the magnetic flux density. The increase of the motor current is, however, limited to such a level that it will not incur critical temperature rise in the motor. Like compensation may be applied to control the speed of the motor 10 during the tightening stages [I] and [II] by suitably adjusting the voltage applied to the motor 10.

It should be understood that the present invention could be successfully adapted in use to tighten bolts, nuts, and the like other fasteners without or with a suitable modification.

What is claimed is:

1. A power tool capable of effecting multi-stage tightening torque control, comprising:
   a DC motor having a motor output shaft operatively connected to a drive bit for tightening fasteners such as a screw and a nut, said motor having a characteristic of increasing an output torque with an increase in a field current fed through said motor;
   a source voltage applying a voltage to drive said motor;
   speed/revolution detecting means detecting a speed and revolutions of said motor;
   drive means connected to drive said motor for varying the speed and torque thereof;
   speed control means controlling said drive means to rotate said motor selectively at high and low speeds for tightening said fastener;
   current sensing means monitoring said field current flowing through said motor to provide a feedback signal;
   current control means controlling to vary said field current based upon said feedback signal for correspondingly varying said output torque of said motor;
   pre-seat judge means determining a pre-seated condition where the fastener is just before seated and providing a pre-seat signal indicative of said pre-seated condition;
   seat detecting means detecting a seated condition where said fastener is actually seated and providing a seat signal indicative of said seated condition;
   input means capable of setting a final tightening torque at which said fastener is tightened past said seated condition and storing said final tightening torque as directly related to a corresponding current limit for said field current flowing through said motor;
   central control means selectively activating said speed control means and said current control means, said central control means operating to firstly activate said speed control means in such a manner as to drive said motor at said high speed, stop it in response to said pre-seat signal, and to restart said motor at said low speed, said central control means responding to said seat signal and activating said current control means instead of said speed control means in such a manner as to drive said motor by controlling to increase said field current in the feedback manner at a suitable rate up to said current limit in order to further tighten said fastener past said seated condition at said final tightening torque determined by said current limit, said central control means operating said current control means to stop feeding said field current after said field current reaches said current limit, thereby stopping said motor.

2. A power tool as set forth in claim 1, wherein said central control means including means capable of increasing said field current at differing rates up to said current limits of different values within a constant period of time so as to complete the tightening of said fastener within substantially the same period of time irrespective of the differing requirements for said final tightening torque.

3. A power tool as set forth in claim 1, further including a temperature sensor sensing the temperature of said motor and providing a sensed temperature output indicative thereof, said central control means including compensation means which, in response to said temperature output, adjusts the field current in compensation for variation in magnetic flux density of a magnetic circuit of said motor to thereby give a consistent tightening torque substantially free from possible temperature variations.

4. A power tool as set forth in claim 1, further including a temperature sensor sensing the temperature of said motor and providing a sensed temperature output indicative thereof, said central control means including compensation means which, in response to said temperature output, adjusts a voltage applied to said motor from said source voltage in compensation for variation in magnetic flux density of a magnetic circuit in said motor in order to drive said motor at said high speed substantially free from possible temperature variations.

5. A power tool as set forth in claim 1, wherein said pre-seat judge means comprises:
   learning means which operates to rotate said motor for tightening a sample fastener to its seated condition and counts a seating revolution number of said motor required for tightening said sample fastener to said seated condition;
   memory means which stores a pre-seating revolution number determined as said seating revolution number minus few revolutions or less;
   cancel means which deactivates said learning means; and
   comparator means which compares the actual number of revolutions of said motor with said pre-seating revolution number so as to issue said pre-seat signal once said actual revolution number reaches said pre-seating revolution number.

6. A power tool as set forth in claim 1, wherein said pre-seat judge means comprises:
   data entry means for entering data indicative of pitch and effective thread length with regard to said fastener to be tightened;
   memory means storing said data;
   calculating means processing said data to obtain a seating revolution number required for tightening said fastener to its seated condition and to obtain a pre-seating revolution number which is said calculated seating revolution number minus a few of revolutions or less; and comparator means which compares an actual revolution number of said motor with said pre-seating revolution number so as to issue said pre-seat signal once said actual revolution number reaches said pre-seating revolution number.

7. A power tool as set forth in claim 1, wherein said pre-seat judge means comprises:
distance sensor means which senses a distance between a bit end of said drive bit and a work surface into which said fastener is being tightened, determines said pre-seated condition when said distance decreases to a predetermined value, and issues said pre-seat signal in response to said pre-seated condition for stopping said motor.

8. A power tool as set forth in claim 7, wherein distance monitor means further comprises:
a pilot rod extending parallel said drive bit from a tool housing for abutment at its distal forward end with the work surface into which said fastener is being tightened, said pilot rod being movable relative to said tool housing for adjusting a distance between said distal end and a corresponding end of said drive bit, said pilot rod being adapted in use to project said distal end past said corresponding end of said drive bit such that said distal end will come into abutment against said work surface before said fastener is tightened to its seated condition; and
sensor means which senses the abutment of said pilot rod against said work surface to issue said pre-seat signal for stopping said motor.

* * * * *